(12) United States Patent
Lee et al.

(10) Patent No.: US 7,649,652 B2
(45) Date of Patent: Jan. 19, 2010

(54) METHOD AND APPARATUS FOR EXPANDING BIT RESOLUTION USING LOCAL INFORMATION OF IMAGE

(75) Inventors: Seung-sin Lee, Yongin-si (KR); Du-sik Park, Suwon-si (KR); Aron Baik, Yongin-si (KR); Chang-yeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 11/544,620

(22) Filed: Oct. 10, 2006

(65) Prior Publication Data

US 2007/0081193 A1    Apr. 12, 2007

(30) Foreign Application Priority Data

Oct. 10, 2005    (KR) ............... 10-2005-0095082

(51) Int. Cl.
H04N 1/409    (2006.01)

(52) U.S. Cl. .................. 358/1.9; 382/260; 358/3.27

(58) Field of Classification Search ............. 358/1.9, 358/3.27; 382/108, 181, 195, 199, 205, 206, 382/254, 260, 261, 263, 266, 299
See application file for complete search history.

(56) References Cited

U.S. PATENT DOCUMENTS

| | | | |
|---|---|---|---|
| 5,742,703 A * | 4/1998 | Lin et al. ............... | 382/176 |
| 5,907,370 A | 5/1999 | Suzuki et al. | |
| 7,187,811 B2 * | 3/2007 | Lin et al. ............... | 382/299 |
| 7,245,779 B2 * | 7/2007 | Keithley ............... | 382/254 |
| 7,532,773 B2 * | 5/2009 | Lu et al. ............... | 382/300 |
| 2005/0069209 A1 * | 3/2005 | Damera-Venkata et al. . | 382/204 |
| 2006/0007465 A1 * | 1/2006 | Hayashi ............... | 358/1.13 |
| 2006/0182361 A1 * | 8/2006 | Ptucha et al. ............... | 382/254 |
| 2007/0086059 A1 * | 4/2007 | Jou et al. ............... | 358/3.27 |

FOREIGN PATENT DOCUMENTS

| | | |
|---|---|---|
| JP | 2001-268361 A | 9/2001 |
| JP | 2002-084428 A | 3/2002 |
| JP | 2005-051337 A | 2/2005 |

* cited by examiner

*Primary Examiner*—Benny Q Tieu
*Assistant Examiner*—Qian Yang
(74) *Attorney, Agent, or Firm*—Sughrue Mion, PLLC

(57) ABSTRACT

A method and apparatus for expanding bit resolution using local information of an image receives an input image. First, second and third threshold value used to enhance bit resolution, to detect a texture and to detect a pattern, respectively, are determined considering global information of the input image. A texture existing in a mask region composed of surrounding pixels within a predetermined range around a current pixel is determined using the second threshold value. A regularly repeated pattern existing in the mask region is determined using the third threshold value if no texture exists in the mask region. The first threshold value is decreased if a texture or pattern exists in the mask region. Values of mask region pixels are adjusted depending on the first threshold value, and bit resolution of the current pixel value is enhanced using a resultant value obtained by filtering the adjusted pixel values.

16 Claims, 11 Drawing Sheets

$d_i(j) = |r_i(j) - r_2(j)|$
$i=0,1,2,3,4 \quad j=0,1,2,\ldots 14$ $e = \sum\sum d_i(j)$

METHOD AND APPARATUS FOR EXPANDING BIT RESOLUTION USING LOCAL INFORMATION OF IMAGE

CROSS-REFERENCE TO RELATED APPLICATION

This application claims priority from Korean Patent Application No. 10-2005-0095082, filed on Oct. 10, 2005, in the Korean Intellectual Property Office, the disclosure of which is incorporated herein in its entirety by reference.

BACKGROUND OF THE INVENTION

1. Field of the Invention

The present invention relates to expanding bit resolution, and more particularly to expanding the bit resolution of a pixel depending on different threshold values using the local characteristics of an image, thus improving the quality of the image without causing the loss of a texture or pattern, and recovering a lost image.

2. Description of the Related Art

Generally, in image processing, lower bits of a pixel value are discarded in a quantization procedure. This results in reduced image quality, or in artificial contours being generated between the components of the image.

In order to solve these problems, research on the expansion of bit resolution has been carried out. U.S. Pat. No. 5,907,370 discloses a method of comparing the difference between a resultant value obtained from low pass filtering, and a resultant value obtained from bit shifting using a predetermined threshold value, and determining an output value, as a method of expanding bit resolution.

However, such a method is problematic. Since a single fixed threshold value is applied to an entire image, low pass filtering is uniformly applied to the entire image without consideration of the local characteristics of the image. As a result, blurring may occur in a portion of the image in which a texture or pattern exists.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention there is provided a method and apparatus for expanding bit resolution, which can expand bit resolution based on different threshold values for respective portions of an image depending on local information of the image, thus expanding bit resolution while maintaining the details of a texture or pattern.

According to another aspect of the present invention there is provided a method and apparatus for expanding bit resolution, which can expand bit resolution using local information of an image, thus displaying a natural image on a high-performance display unit.

According to a further aspect of the present invention there is provided a method and apparatus for expanding bit resolution, which can expand bit resolution using local information of an image, thus recovering pixel information lost in image processing.

In accordance with one aspect of the present invention there is provided a method of expanding bit resolution including receiving an input image, determining a first threshold value required to enhance bit resolution, a second threshold value required to detect a texture and a third threshold value required to detect a pattern, in consideration of global information of the input image, determining whether a texture exists in a mask region composed of surrounding pixels existing within a predetermined range around a current pixel using the second threshold value, determining whether a regularly repeated pattern exists in the mask region using the third threshold value if it is determined that no texture exists in the mask region, decreasing the first threshold value if it is determined that a texture or a pattern exists in the mask region, adjusting values of pixels in the mask region depending on the first threshold value, and enhancing bit resolution of the current pixel value using a resultant value obtained by filtering the adjusted pixel values.

In accordance with another aspect of the present invention, there is provided an apparatus for expanding bit resolution including means for receiving an input image, means for determining a first threshold value required to enhance bit resolution, a second threshold value required to detect a texture and a third threshold value required to detect a pattern, in consideration of global information of the input image, means for determining whether a texture exists in a mask region composed of surrounding pixels existing within a predetermined range around a current pixel using the second threshold value, means for determining whether a regularly repeated pattern exists in the mask region using the third threshold value if it is determined that no texture exists in the mask region, means for decreasing the first threshold value if it is determined that a texture or a pattern exists in the mask region, and means for adjusting values of pixels in the mask region depending on the first threshold value, and enhancing bit resolution of the current pixel value using a resultant value obtained by filtering the adjusted pixel values.

BRIEF DESCRIPTION OF THE DRAWINGS

The above and other aspects of exemplary embodiments of the present invention will be more clearly understood from the following detailed description taken in conjunction with the accompanying drawings, in which.

DETAILED DESCRIPTION OF THE EXEMPLARY EMBODIMENTS

Figure 1:
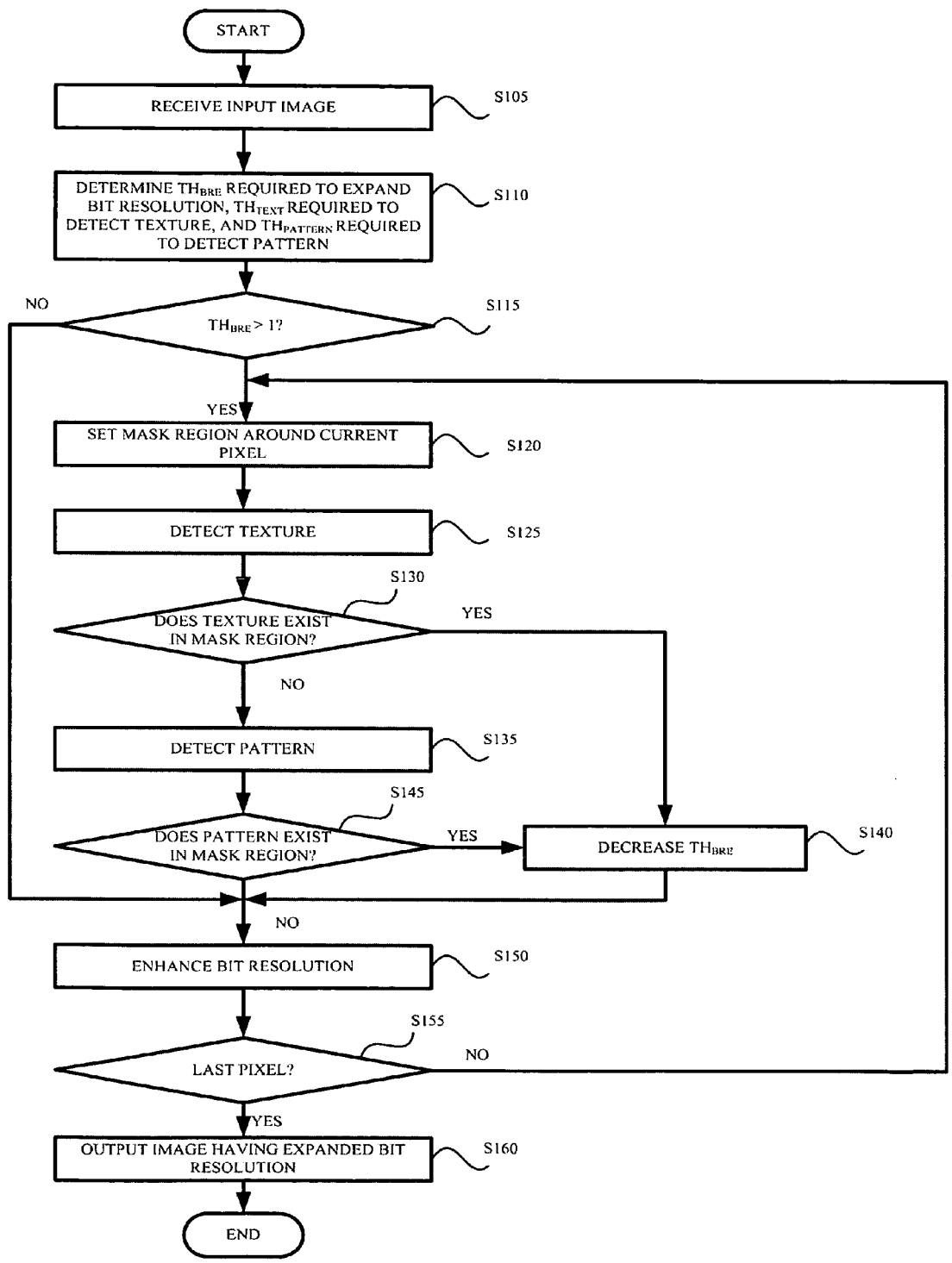
FIG. 1 is a flowchart illustrating the overall process of a method of expanding bit resolution according to an exemplary embodiment of the present invention.

Reference now should be made to the drawings, in which the same reference numerals are used throughout the different drawings to designate the same or similar components.

Hereinafter, exemplary embodiments of the present invention will be described in detail with reference to the attached drawings. It will be understood that the combinations of blocks of the attached block diagrams and steps of the attached flowchart illustrations can be implemented by computer program instructions. These computer program instructions can be provided to a processor of a general purpose computer, special purpose computer, or other programmable data processing apparatuses, such that the instructions, which are executed via the processor of the computer or other programmable data processing apparatuses, create means for implementing the functions specified in the blocks of the block diagrams or the steps of the flowchart illustrations. These computer program instructions may also be stored in a computer usable or computer-readable memory that can direct a computer or other programmable data processing apparatuses to function in a particular manner, such that the instructions stored in the computer usable or computer-readable memory produce an article of manufacture including instruction means that implement the function specified in the blocks of the block diagrams or the steps of the flowchart illustrations. The computer program instructions may also be loaded into a computer or other programmable data processing apparatuses to cause a series of operational steps to be performed in the computer or other programmable apparatuses to realize a computer-implemented process, such that the instructions that are executed on the computer or other programmable apparatuses provide steps for implementing the functions specified in the blocks of the block diagram or steps of the flowchart illustrations.

In addition, each block or each step may represent a module, segment, or portion of code, which includes one or more executable instructions for implementing the specified logical function(s). It should also be noted that in some alternative implementations, the functions noted in the blocks or steps may occur in a different order. For example, two blocks or steps shown in succession may in fact be executed substantially concurrently or the blocks or steps may sometimes be executed in reverse order, depending upon the functionality involved.

FIG. 1 is a flowchart illustrating the overall method of expanding bit resolution of an exemplary embodiment of the present invention.

In the bit resolution expansion method of the exemplary embodiment of the present invention, an image is received S105, and threshold values required to expand bit resolution are calculated S110. The threshold values required to expand bit resolution may include a threshold value $TH_{BRE}$ used in a bit resolution enhancement step S150, a threshold value $TH_{TEXT}$ used to detect a texture, and a threshold value $TH_{PATTERN}$ used to detect a pattern.

If $TH_{BRE}$ is equal to or less than 1 (NO in step S115), the bit resolution enhancement step S150 is immediately performed. If $TH_{BRE}$ is greater than 1 (YES in step S115) a mask region composed of pixels that are to be considered is set around a pixel, the bit resolution of which is intended to be expanded, in step S120. Whether the mask region includes a texture is detected S125. If a texture exists in the mask region (YES in step S130), the threshold value $TH_{BRE}$ is decreased S140 so that the details of the texture are prevented from being eliminated. If no texture exists in the mask region (NO in step S130), whether a pattern exists in the mask region is detected S135. If a pattern exists in the mask region (YES in step S145), the threshold value $TH_{BRE}$ is decreased S140, thus preventing the pattern from being blurred due to filtering. If neither texture nor pattern exists in the mask region (NO in step S145), the mask region is filtered depending on the threshold value $TH_{BRE}$ calculated when the image is received. If either texture or pattern exists in the mask region, the bit resolution of the current pixel is enhanced using the value obtained by filtering the mask region depending on the decreased threshold value $TH_{BRE}$ S150. A procedure according to step S120 through step S150 is performed with respect to all pixels in the image. As a result, an image having expanded bit resolution is output S160.

In FIG. 1, if it is determined that no texture exists after the texture detection step S125 has been performed, pattern detection step S135 is performed. However, if necessary, when no pattern is detected after the pattern detection step S135 has been performed, the texture detection step S125 may be performed.

The bit resolution expansion method of the exemplary embodiment of the present invention adjusts the threshold value $TH_{BRE}$ depending on whether a texture or pattern exists with respect to each mask region, thus expanding bit resolution while preventing the blurring of a texture or pattern.

Figure 2:
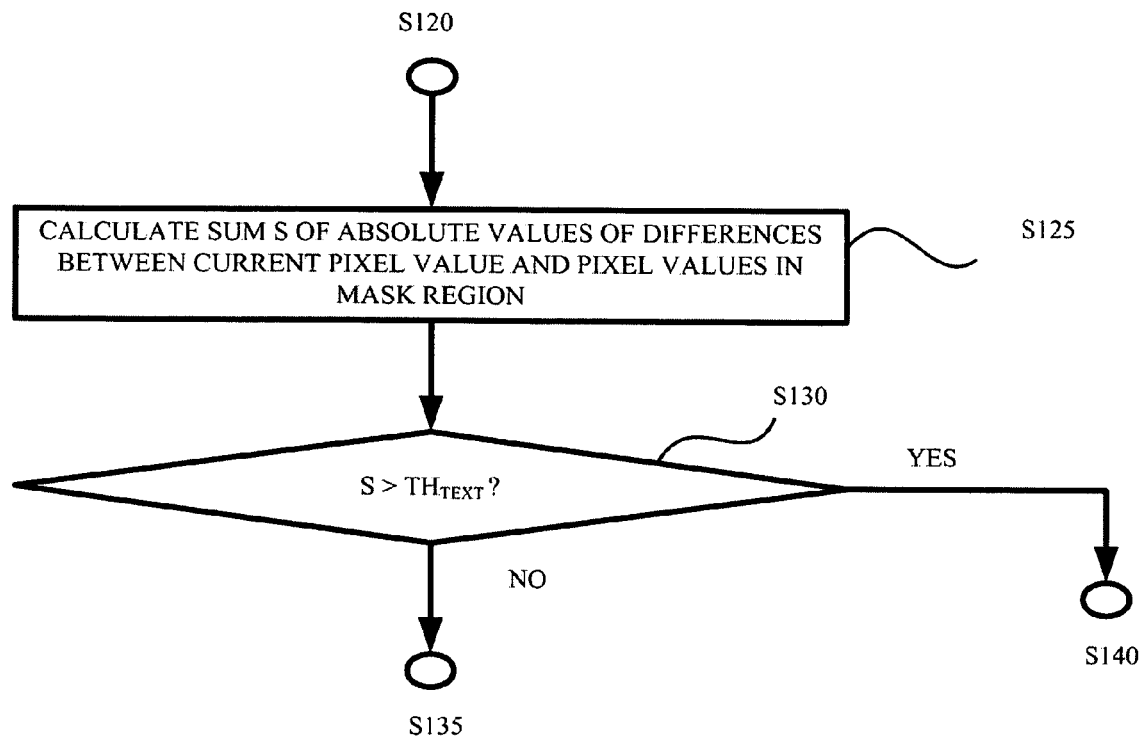
FIG. 2 is a detailed flowchart illustrating the texture detection step of the bit resolution expansion method according to an exemplary embodiment of the present invention.

FIG. 2 is a detailed flowchart illustrating the texture detection step S125 of the bit resolution expansion method of an exemplary embodiment of the present invention.

Whether a texture or pattern exists in a mask region for a current pixel is determined using a value S obtained by summing the absolute values of the differences between the value of the current pixel and the values of pixels existing in the mask region S125. A formula for obtaining the value S is defined by Equation 1:

$$S = \sum_{i=0}^{4} \sum_{j=0}^{14} |X_{i,j} - X_c| \qquad [1]$$

In this case, $X_c$ is the current pixel value, and $X_{ij}$ is a pixel value existing in the i-th row and the j-th column of the mask region having a 5×15 size. Hereinafter, description will be conducted on the basis of the case where the size of the mask region is 5×15. However, the present invention is not to be interpreted as being limited to this case.

If the value S is greater than THTEXT (YES in step S130), it is determined that the mask region includes a texture, and the differences between the current pixel value and surrounding pixel values are large. Accordingly, the threshold value THBRE is decreased to prevent the texture from being blurred due to filtering, performed at bit resolution enhancement step S150, S140.

Figure 3:
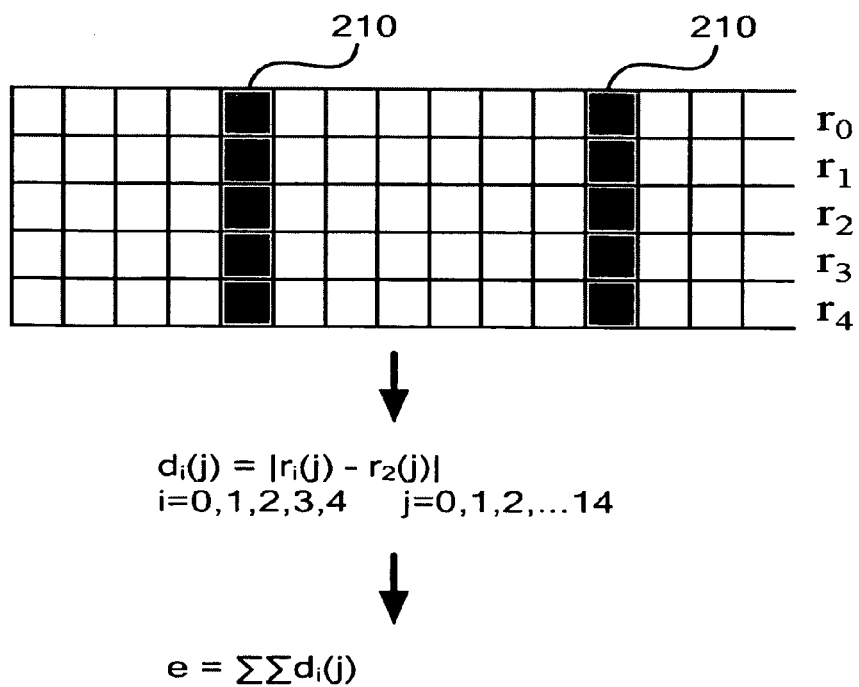
FIG. 3 is a conceptual view illustrating the detection of a pattern for the bit resolution expansion method according to an exemplary embodiment of the present invention.

FIG. 3 is a conceptual view showing the detection of a pattern for the bit resolution expansion method of an exemplary embodiment of the present invention. The bit resolution expansion method detects whether a regularly repeated pattern exists in the mask region, thus preventing the blurring of weak edges, which is not detected at the bit resolution enhancement step S150. As shown in FIG. 3, in the case of a horizontally repeated pattern 210, it can be assumed that, if the differences between pixel values in the rows of the mask region are obtained, the sum of the differences will approach zero. If the sum e of the differences between the pixel values in the rows of the mask region is less than $TH_{PATTERN}$, it is determined that a horizontally repeated pattern exists or that the mask region is smooth as a whole, so that the threshold value $TH_{BRE}$ is decreased.

When a pattern, regularly repeated in a horizontal direction, exists in the mask region, the differences d between pixel values in rows $r_0$ to $r_4$ around a middle row $r_2$ and pixel values corresponding to the middle row $r_2$ are expressed by the following equation.

$$d_i(j)=|r_i(j)-r_2(j)| \quad [2]$$

In this case, i denotes a row, and j denotes a column. The calculation of $d_i(j)$ performed on the basis of the row $r_2$ is only an exemplary embodiment. The differences between pixel values in rows can be calculated on the basis of any row.

Therefore, the sum e of the differences between the pixel values in the rows of the mask region can be expressed by the following equation.

$$e = \sum_{i=0}^{4} \sum_{j=0}^{14} d_i(j) \quad [3]$$

If a vertically repeated pattern exists, the pattern can be detected using the above method. That is, it can be assumed that, if the differences between pixel values in the columns of the mask region are obtained, the sum of the differences will approach zero. If the sum e of the differences between pixel values in the columns of the mask region is less than $TH_{PATTERN}$, it is determined that the vertically repeated pattern exists or that the mask region is smooth as a whole, so that the threshold value $TH_{BRE}$ is decreased.

Figure 4:
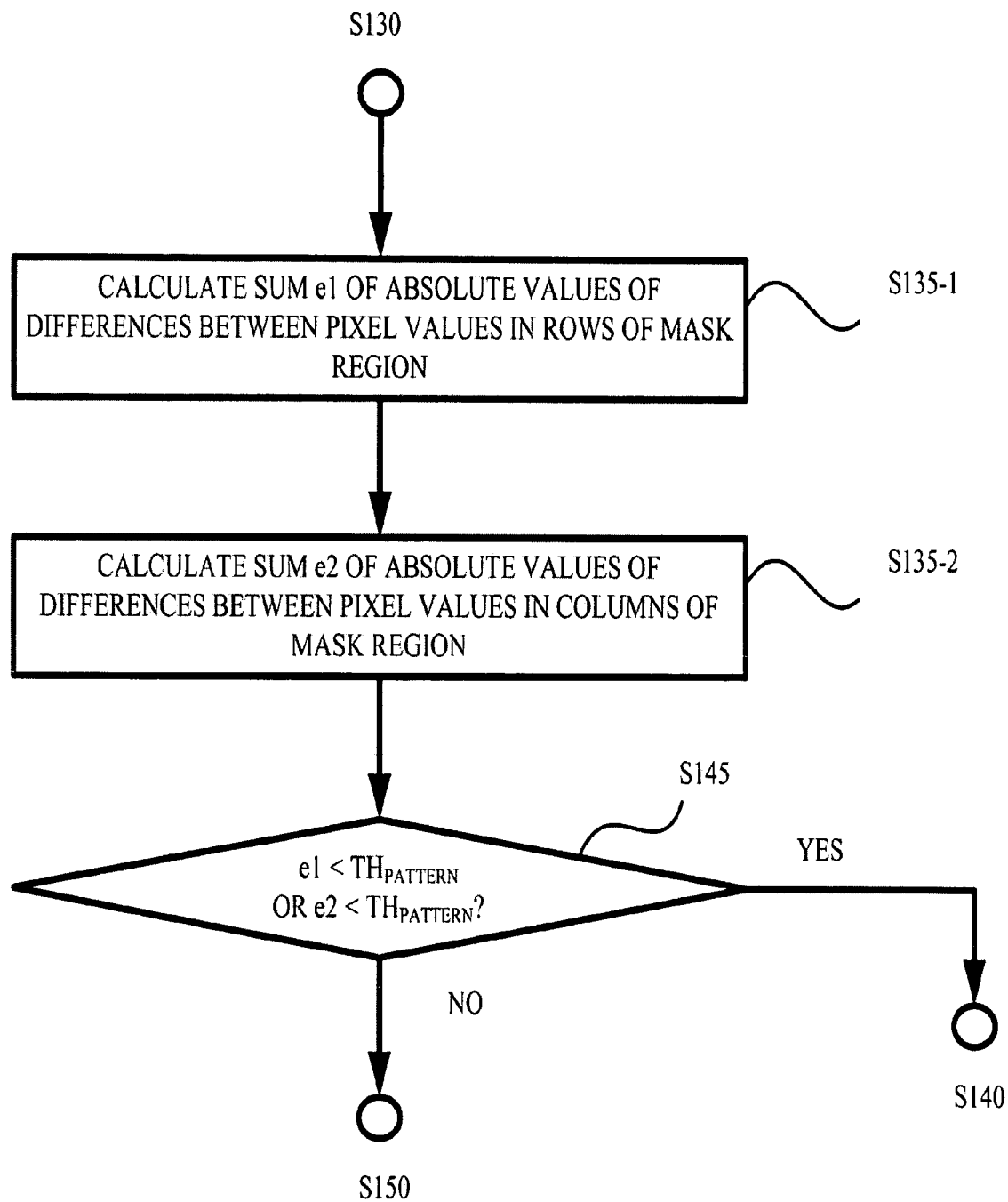
FIG. 4 is a detailed flowchart illustrating the pattern detection step of the bit resolution expansion method according to an exemplary embodiment of the present invention.

FIG. 4 is a detailed flowchart illustrating the pattern detection step S135 of the bit resolution expansion method of an exemplary embodiment of the present invention.

As described above, the absolute values of the differences between the pixel values in the rows of the mask region are summed to obtain a value e1 S135-1, and the absolute values of the differences between the pixel values in the columns of the mask region are summed to obtain a value e2 S135-2. If the value e1 is less than $TH_{PATTERN}$, or the value e2 is less than $TH_{PATTERN}$ (YES in step S145), it is determined that a regularly repeated pattern exists in the mask region, and the threshold value $TH_{BRE}$ is decreased. If the value e1 is less than $TH_{PATTERN}$, it is determined that a pattern regularly repeated in a horizontal direction exists in the mask region or that the mask region is a smooth image as a whole. If the value e2 is less than $TH_{PATTERN}$, it is determined that a pattern regularly repeated in a vertical direction exists in the mask region or that the mask region is a smooth image as a whole.

Figure 5:
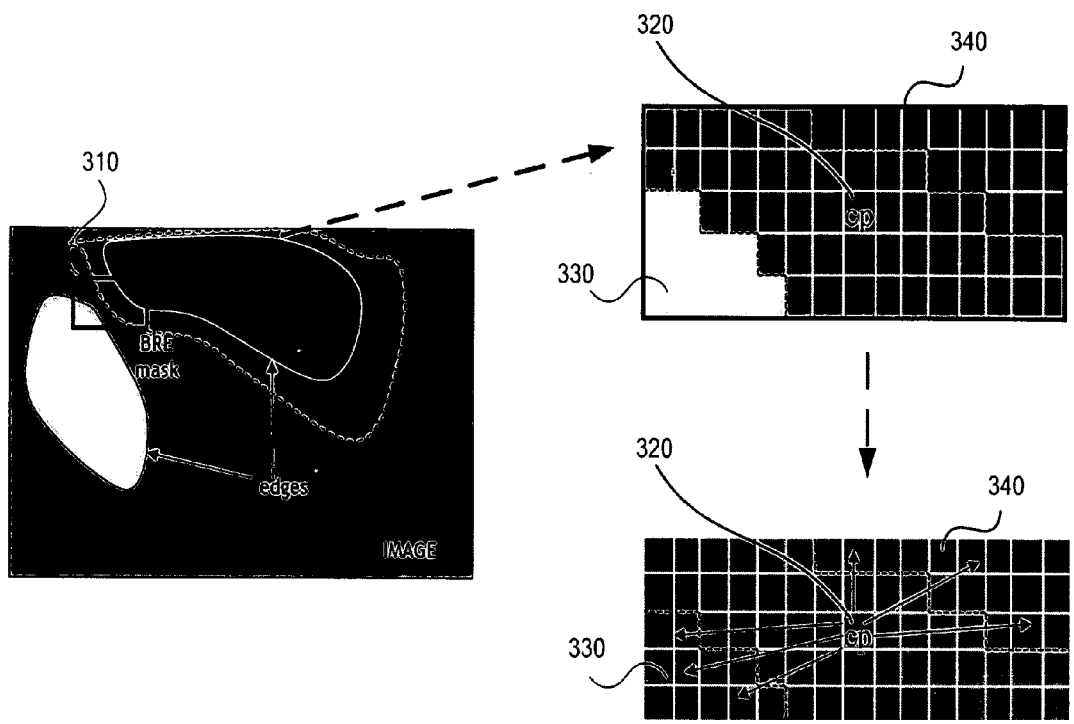
FIG. 5 is a diagram illustrating a method of enhancing bit resolution for the bit resolution expansion method according to an exemplary embodiment of the present invention.

FIG. 5 is a diagram illustrating a method of enhancing bit resolution of the bit resolution expansion method of an exemplary embodiment of the present invention.

In order to prevent the blurring of edges existing in a mask region 310, the values of pixels 330 and 340, each having a difference that is obtained with respect to the value of a current pixel 320 and is greater than $TH_{BRE}$, are replaced with the value of the current pixel 320, and the current pixel value is changed to a resultant value obtained by filtering the adjusted pixel values.

The procedure of filtering the adjusted surrounding pixel values is expressed by the following equation.

$$X_{cp} = \sum_{i=0}^{4} \sum_{j=0}^{14} X_{adj}(i,j)h(i,h) \quad [4]$$

In this case, $X_{cp}$ denotes the value of the current pixel, $X_{adj}$ denotes an adjusted pixel value in the mask region, and h(i,j) denotes a filter coefficient. As an example of the filter coefficient, 1/75 can be used.

Figure 6:
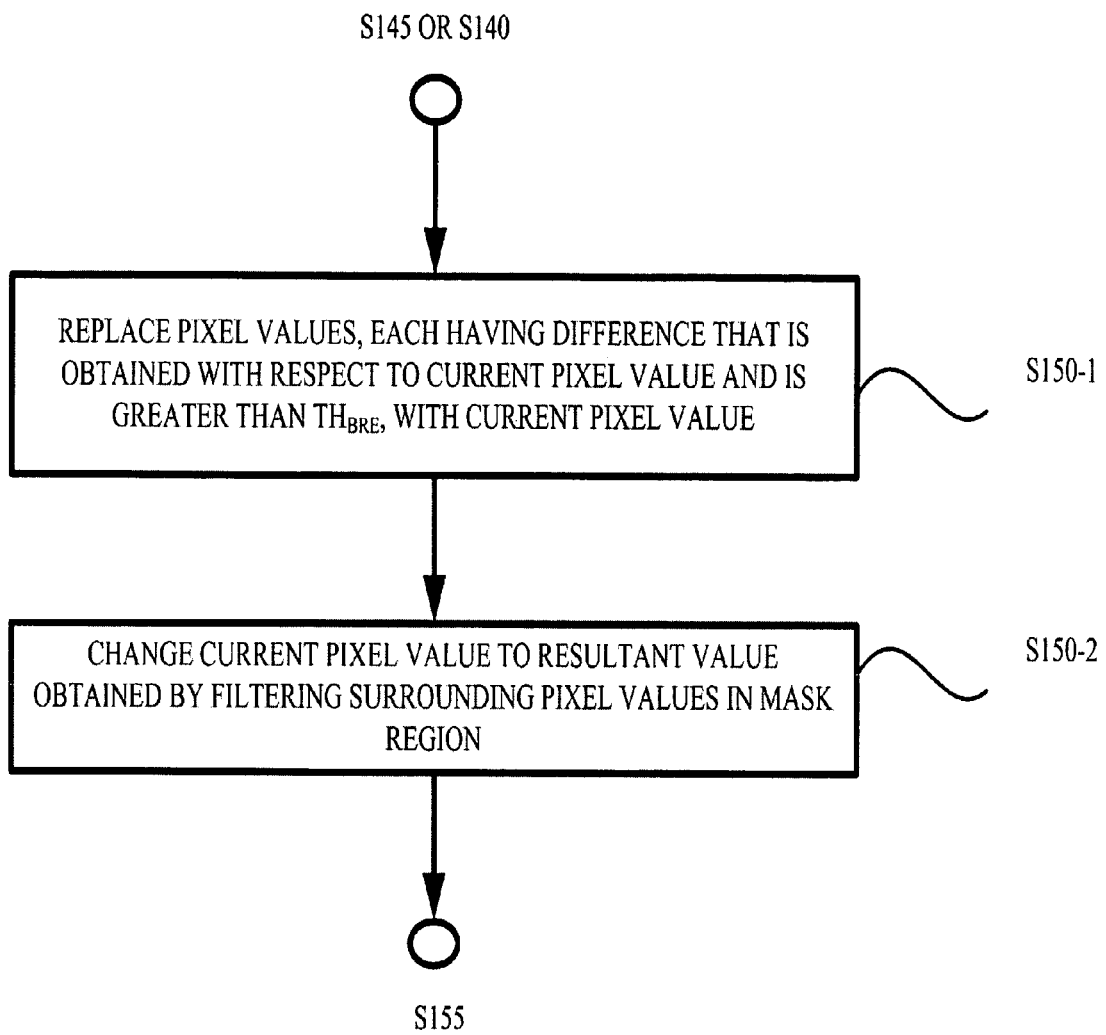
FIG. 6 is a detailed flowchart illustrating the bit resolution enhancement step of the bit resolution expansion method according to an exemplary embodiment of the present invention.

FIG. 6 is a detailed flowchart illustrating the bit resolution enhancement step S150 of the bit resolution expansion method of an exemplary embodiment of the present invention.

The values of pixels, each having a difference that is obtained with respect to the current pixel value and is greater than $TH_{BRE}$, among pixels in the mask region, are replaced with the current pixel value S150-1 and the sum of resultant values obtained by filtering the adjusted pixel values in the mask region is set to a current pixel value, so that the bit resolution of the current pixel is enhanced.

The fact that the threshold value $TH_{BRE}$ is decreased means that when a texture or pattern exists in the mask region, the values of surrounding pixels are replaced with the current pixel value so that the current pixel value is prevented from being influenced by the texture or pattern, thus preventing the blurring of the texture or pattern.

Figure 7:
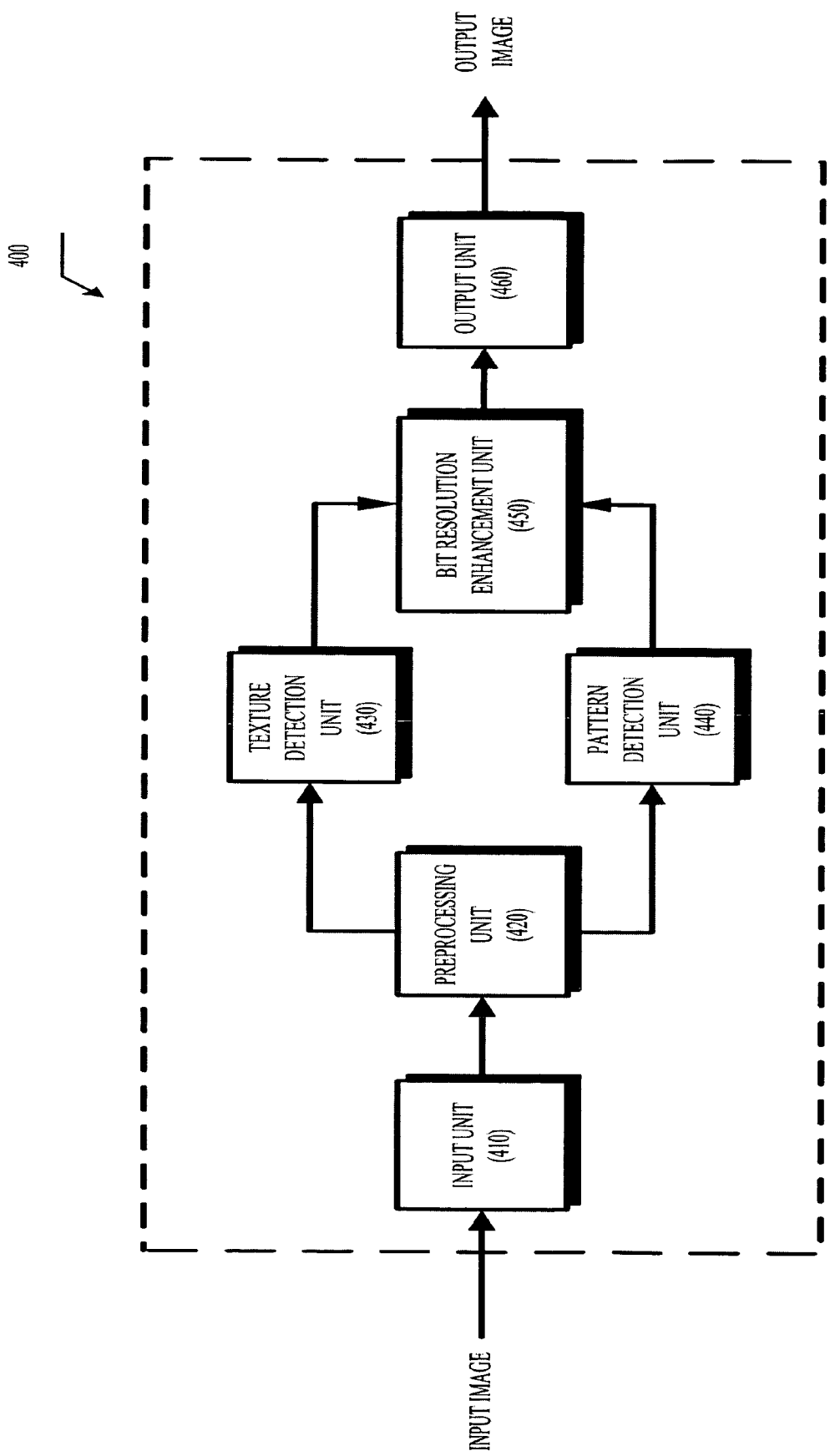
FIG. 7 is a block diagram illustrating the construction of an apparatus for expanding bit resolution according to an exemplary embodiment of the present invention.

FIG. 7 is a block diagram illustrating the construction of an apparatus for expanding bit resolution of an exemplary embodiment of the present invention.

A bit resolution expansion apparatus 400 of an exemplary embodiment of the present invention may include an input unit 410, a preprocessing unit 420, a texture detection unit 430, a pattern detection unit 440, a bit resolution enhancement unit 450, and an output unit 460.

The input unit 410 receives an image and transmits the image to the preprocessing unit 420. The preprocessing unit 420 experimentally determines threshold values $TH_{BRE}$, $TH_{TEXT}$ and $TH_{PATTERN}$ in consideration of global information of the input image. For example, the threshold values can be obtained using the average, the standard deviation, the maximum value, the minimum value, the input/output bit resolution, the noise level, etc. of the pixel values of the entire image.

As described above with reference to FIG. 2, the texture detection unit 430 determines whether a texture exists in the mask region, and decreases the threshold value $TH_{BRE}$ if it is determined that a texture exists. Of the description made with reference to FIGS. 3 and 4, the pattern detection unit 440 determines whether a regular pattern is repeated in a horizontal or vertical direction in the mask region, and decreases the threshold value $TH_{BRE}$ if it is determined that a regular pattern exists.

The bit resolution enhancement unit 450 adjusts the values of the pixels in the mask region depending on the threshold value $TH_{BRE}$ adjusted by the texture detection unit 430 or the pattern detection unit 440, and resets a current pixel value based on the results obtained by filtering the adjusted pixel values, thus expanding the bit resolution of the current pixel.

The output unit 460 outputs an image, the bit depth of which is increased by the bit resolution enhancement unit 450, to a display unit.

The components of FIG. 7 may be software, or hardware, such as a Field Programmable Gate Array (FPGA) or an Application Specific Integrated Circuit (ASIC). However, the components are not limited to software or hardware, but may be implemented to be stored in an addressable storage medium, or may be implemented to execute on one or more processors. The functions provided in the components may be implemented using more detailed components, or may be implemented to combine a plurality of components with each other and perform a specific function. In addition, the components can be implemented to execute one or more computers in a system.

Figure 8A:
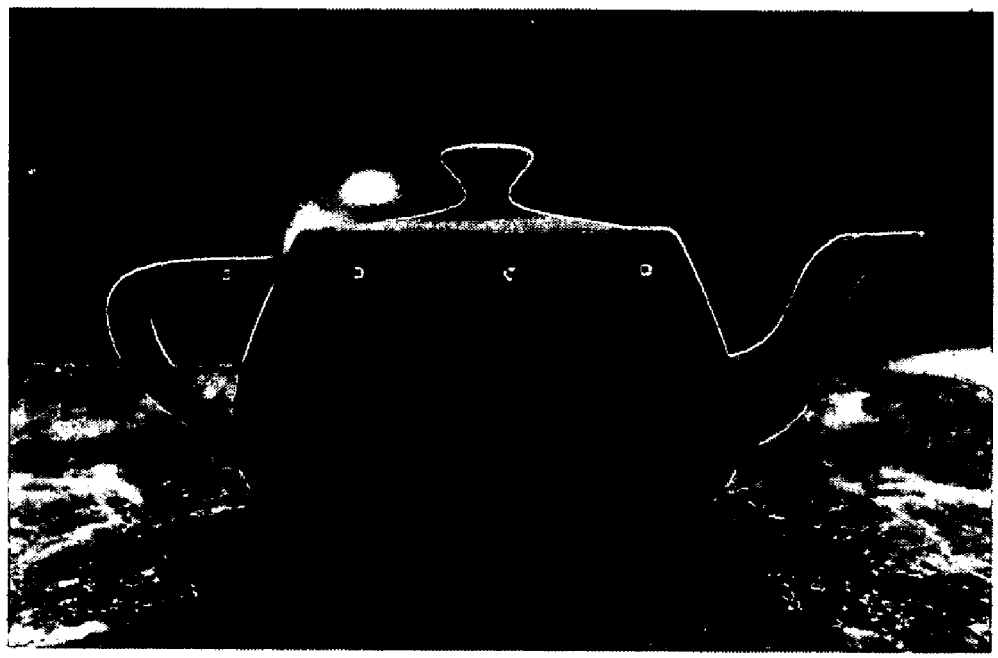
FIGS. 8A and 8B are images illustrating results obtained by applying the bit resolution expansion method according to the exemplary embodiment of the present invention to an image.
Figure 8B:
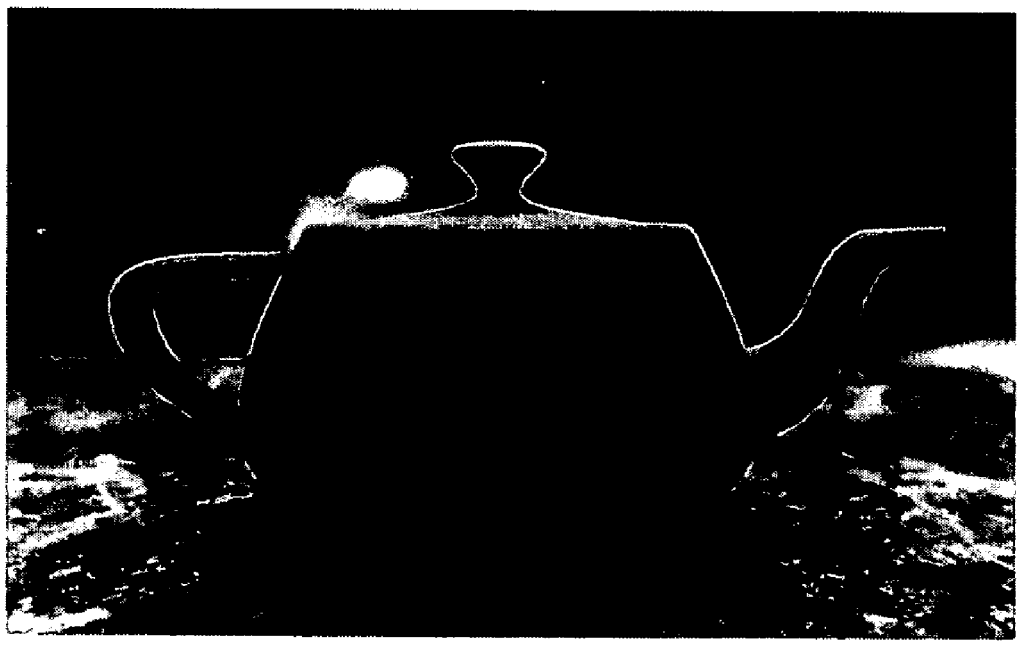

FIGS. 8A and 8B are images illustrating results obtained by applying the bit resolution expansion method of the exemplary embodiment of the present invention to an image.

The image of FIG. 8A having 6-bit resolution is converted into the 8-bit image of FIG. 8B using the bit resolution expansion method of the exemplary embodiment of the present invention. FIGS. 8A and 8B illustrate results indicating that the initial value of $TH_{BRE}$ is set to "4", and the threshold value $TH_{BRE}$ is decreased to "1" when a texture or pattern is detected in the mask region. It can be seen that artificial contours on the curved surface of a kettle are eliminated while the texture of the surface of a table is maintained without change.

FIGS. 9A to 10B illustrate the comparison of results obtained when the bit resolution expansion method of the present invention is applied to an image and when it is not applied to an image.

Figure 9A:
FIGS. 9A and 9B are an 8-bit image and a 12-bit image, respectively, illustrating the bit resolution expansion method of an exemplary embodiment of the present invention.
Figure 9B:
Figure 10A:
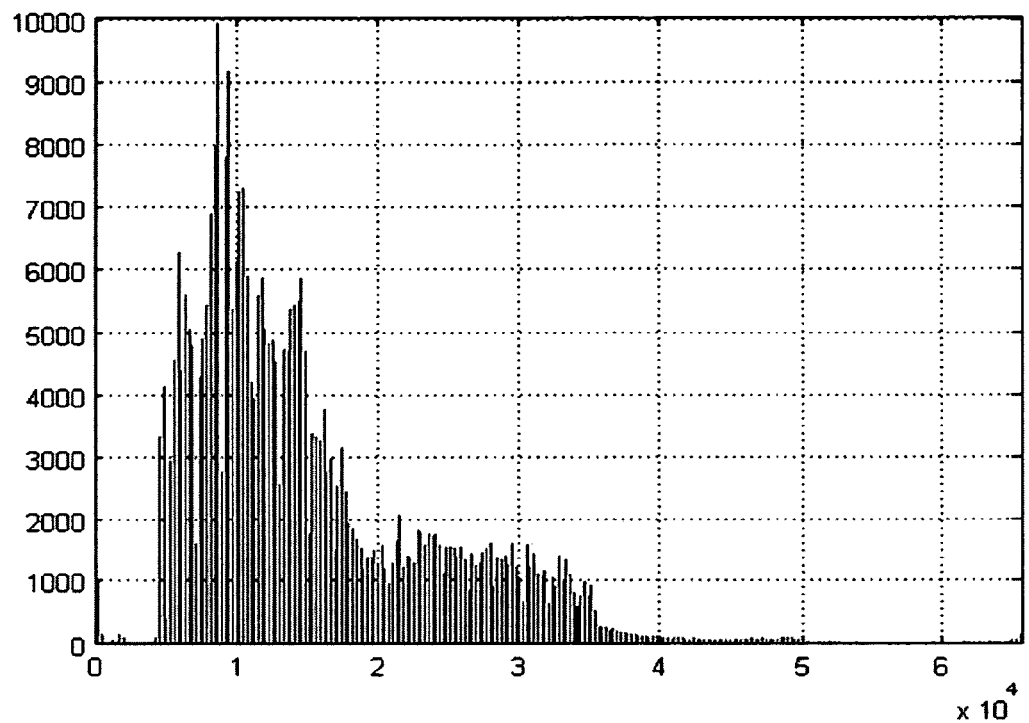
FIGS. 10A and 10B are output histograms of the images of FIGS. 9A and 9B, respectively.
Figure 10B:
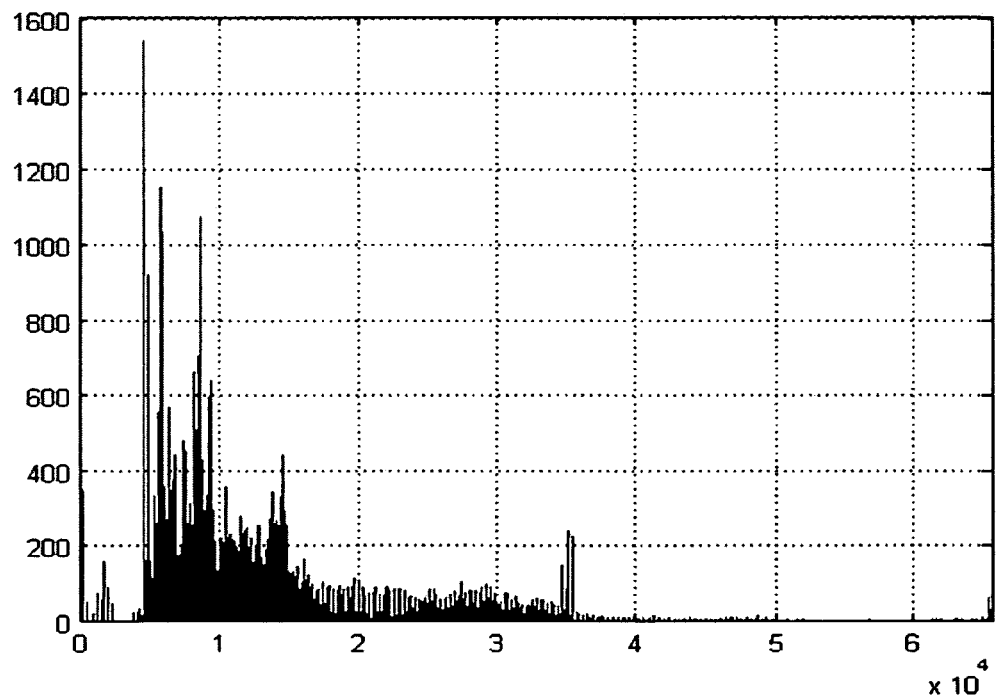

In this experiment, the 8-bit image of FIG. 9A is converted to the 12-bit image of FIG. 9B using the bit resolution expansion method of an exemplary embodiment of the present invention. The initial value of $TH_{BRE}$ is set to "2" and is decreased to "1" when a texture or pattern is detected in the mask region. The graph of FIG. 10A is the output histogram of the image of FIG. 9A, to which the bit resolution expansion method is not applied, and the graph of FIG. 10B is the output histogram of the image of FIG. 9B, to which the bit resolution expansion method of the exemplary embodiment of the present invention is applied.

FIGS. 11A to 11D are graphs illustrating the comparison of profiles of the original image and the image to which the bit resolution expansion method is applied in FIGS. 9A and 9B.

Figure 11A:
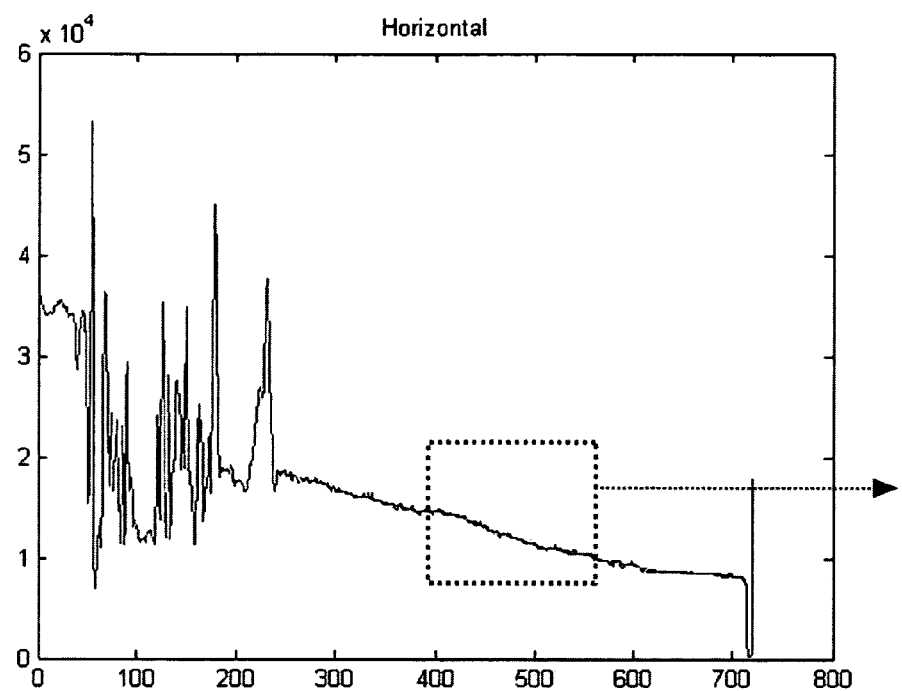
FIGS. 11A to 11D are graphs illustrating the comparison of profiles of the original image and the image to which the bit resolution expansion method is applied in FIGS. 9A and 9B.
Figure 11B:
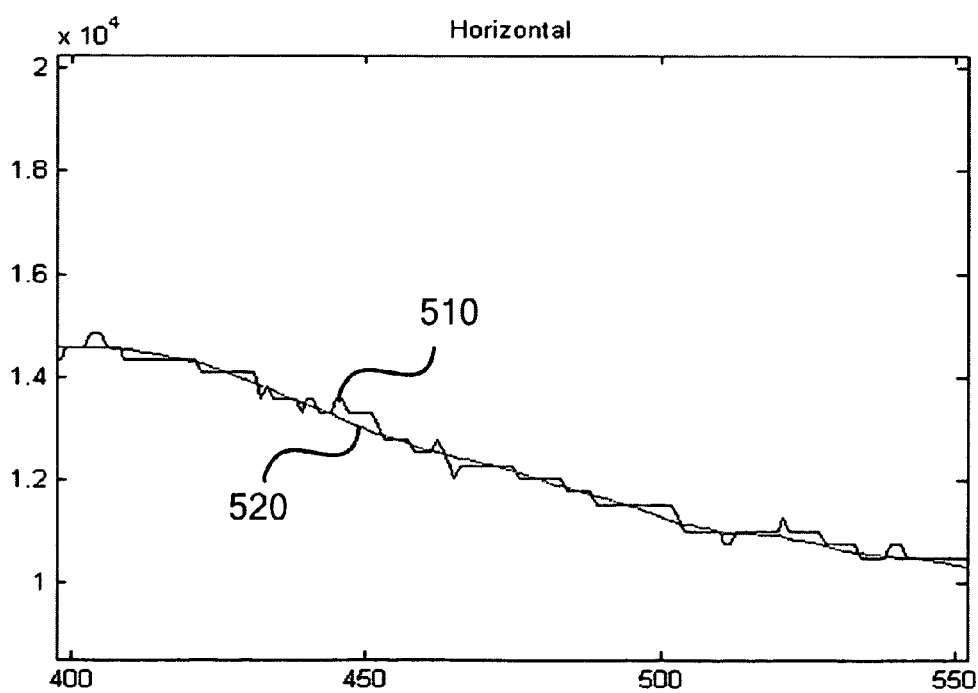

The graphs of FIGS. 11A and 11B compare the pixel values in the specific rows of the original image and the converted image of FIGS. 9A and 9B. Curve 510 denotes the pixel values of the original image, and curve 520 denotes the pixel values of the converted image. The graph of FIG. 11B is an enlarged view of a part of the graph of FIG. 11A. It can be seen that the curve 520 indicating the pixel values of the converted image has values similar to those of the curve 510 and exhibits a smooth shape having less unevenness than the curve 510. This shows that insufficiency of gray scales caused by the expansion of bit resolution is mitigated in the converted image without the details of the converted image being lost, so that an image having higher quality is generated.

Figure 11C:
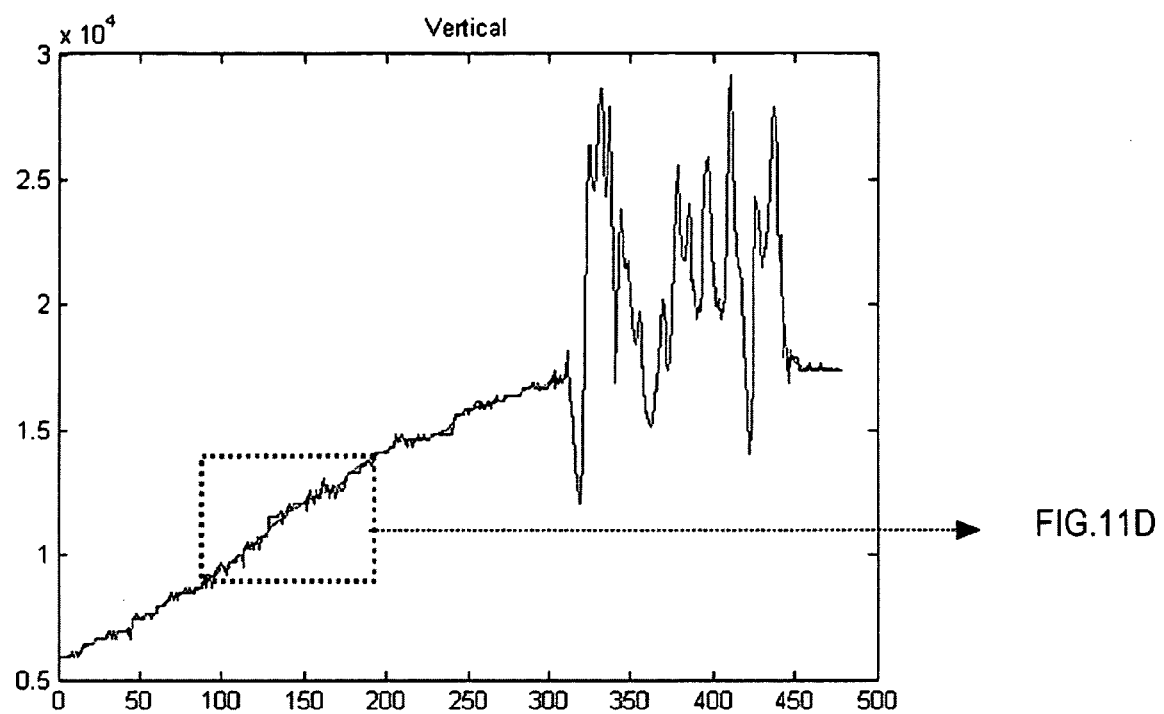
Figure 11D:
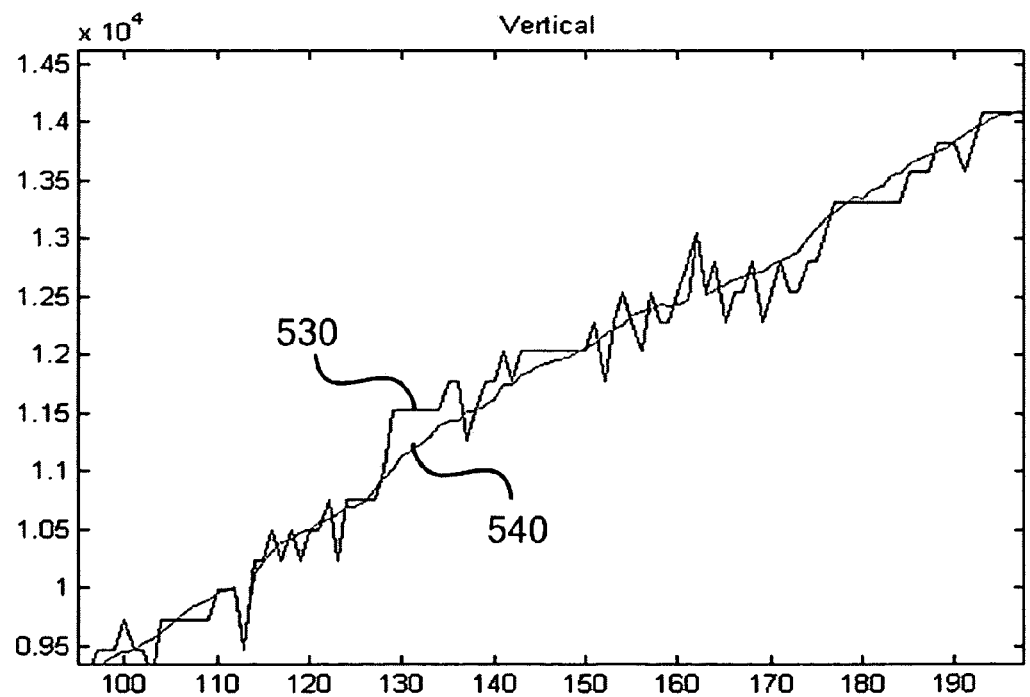

The graphs of FIGS. 11C and 11D compare the pixel values in the specific columns of the original image and the converted image of FIGS. 9A and 9B. It can be seen that curve 540, indicating the pixel values of the converted image, also has values similar to those of a curve 530 and exhibits a smooth shape having less unevenness than the curve 530.

As described above, the bit resolution expansion method and apparatus of the present invention have the following advantages.

The present invention is advantageous in that it variously expands bit resolution based on different threshold values for respective portions of an image, depending on local information of the image, thus expanding bit resolution while maintaining the details of a texture or pattern.

The present invention is also advantageous in that it expands bit resolution using local information of an image having a certain bit depth, thus displaying a natural image on a high-performance display unit.

The present invention is also advantageous in that it expands bit resolution using local information of an image, thus recovering pixel information lost in image processing.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of expanding bit resolution, the method comprising:
   receiving an input image;
   determining a first threshold value used to enhance bit resolution, a second threshold value used to detect a texture and a third threshold value used to detect a pattern, in consideration of global information of the input image;
   determining whether a texture exists in a mask region composed of surrounding pixels existing within a predetermined range around a current pixel, using the second threshold value;
   determining whether a regularly repeated pattern exists in the mask region, using the third threshold value if it is determined that no texture exists in the mask region;
   decreasing the first threshold value if it is determined that a texture or a pattern exists in the mask region; and
   adjusting values of pixels in the mask region depending on the first threshold value, and enhancing bit resolution of the current pixel value using a resultant value obtained by filtering the adjusted pixel values.

2. The bit resolution expansion method of claim 1, wherein the determining whether a texture exists comprises:
   summing absolute values of differences between the current pixel value and pixel values existing in the mask region; and
   determining that a texture exists in the mask region if it is determined that a sum of the absolute values is greater than the second threshold value.

3. The bit resolution expansion method of claim 1, wherein the determining whether a pattern exists comprises:
   summing absolute values of differences between pixel values in rows of the mask region;
   summing absolute values of differences between pixel values in columns of the mask region; and
   determining that a pattern exists in the mask region if a sum of the absolute values of the differences between pixel values in the rows is less than the third threshold value, or if a sum of the absolute values of the differences between the pixel values in the columns is less than the third threshold value.

4. The bit resolution expansion method of claim 1, wherein the enhancing of the bit resolution comprises:
   replacing values of pixels, each having a difference that is obtained with respect to the current pixel value and is greater than the first threshold value among the pixels in the mask region, with the current pixel value; and changing the current pixel value to a resultant value obtained by filtering the replaced pixel values.

5. The bit resolution expansion method of claim 1, wherein the determining threshold values comprises determining the first, second and third threshold values using a standard deviation of the pixel values constituting the input image.

6. An apparatus for expanding bit resolution, the apparatus comprising:

means for receiving an input image;

means for determining a first threshold value used to enhance bit resolution, a second threshold value used to detect a texture and a third threshold value used to detect a pattern, in consideration of global information of the input image;

means for determining whether a texture exists in a mask region composed of surrounding pixels existing within a predetermined range around a current pixel using the second threshold value;

means for determining whether a regularly repeated pattern exists in the mask region, using the third threshold value if it is determined that no texture exists in the mask region;

means for decreasing the first threshold value if it is determined that a texture or a pattern exists in the mask region; and means for adjusting values of pixels in the mask region depending on the first threshold value, and enhancing bit resolution of the current pixel value using a resultant value obtained by filtering the adjusted pixel values.

7. The bit resolution expansion apparatus of claim 6, wherein the means for determining whether a texture exists comprises:

means for summing absolute values of differences between the current pixel value and pixel values existing in the mask region; and means for determining that a texture exists in the mask region if it is determined that a sum of the absolute values is greater than the second threshold value.

8. The bit resolution expansion apparatus of claim 6, wherein the means for determining whether a pattern exists comprises:

means for summing absolute values of differences between pixel values in rows of the mask region;

means for summing absolute values of differences between pixel values in columns of the mask region; and means for determining that a pattern exists in the mask region if a sum of the absolute values of the differences between pixel values in the rows is less than the third threshold value, or if a sum of the absolute values of the differences between the pixel values in the columns is less than the third threshold value.

9. The bit resolution expansion apparatus of claim 6, wherein the means for enhancing bit resolution comprises:

means for replacing values of pixels, each having a difference that is obtained with respect to the current pixel value and is greater than the first threshold value among the pixels in the mask region, with the current pixel value; and means for changing the current pixel value to a resultant value obtained by filtering the replaced pixel values.

10. The bit resolution expansion apparatus of claim 6, wherein the means for determining threshold values determines the first, second and third threshold values using a standard deviation of the pixel values constituting the input image.

11. A computer-readable medium for storing code comprising a computer-executable program for causing the computer to perform a method of expanding bit resolution, the program comprising instructions for:

receiving an input image;

determining a first threshold value used to enhance bit resolution, a second threshold value used to detect a texture and a third threshold value used to detect a pattern, in consideration of global information of the input image;

determining whether a texture exists in a mask region composed of surrounding pixels existing within a predetermined range around a current pixel, using the second threshold value;

determining whether a regularly repeated pattern exists in the mask region, using the third threshold value if it is determined that no texture exists in the mask region;

decreasing the first threshold value if it is determined that a texture or a pattern exists in the mask region; and adjusting values of pixels in the mask region depending on the first threshold value, and enhancing bit resolution of the current pixel value using a resultant value obtained by filtering the adjusted pixel values.

12. The program of claim 11, wherein the determining whether a texture exists comprises:

summing absolute values of differences between the current pixel value and pixel values existing in the mask region; and determining that a texture exists in the mask region if it is determined that a sum of the absolute values is greater than the second threshold value.

13. The program of claim 11, wherein the determining whether a pattern exists comprises:

summing absolute values of differences between pixel values in rows of the mask region;

summing absolute values of differences between pixel values in columns of the mask region; and determining that a pattern exists in the mask region if a sum of the absolute values of the differences between pixel values in the rows is less than the third threshold value, or if a sum of the absolute values of the differences between the pixel values in the columns is less than the third threshold value.

14. The program of claim 11, wherein the enhancing of the bit resolution comprises:

replacing values of pixels, each having a difference that is obtained with respect to the current pixel value and is greater than the first threshold value among the pixels in the mask region, with the current pixel value; and changing the current pixel value to a resultant value obtained by filtering the replaced pixel values.

15. The program of claim 11, wherein the determining threshold values comprises determining the first, second and third threshold values using a standard deviation of the pixel values constituting the input image.

16. An apparatus for expanding bit resolution, the apparatus comprising:

an input unit which receives an input image;

a hardware preprocessing unit which determines a first threshold value required used to enhance bit resolution, a second threshold value required used to detect a texture and a third threshold value required used to detect a pattern, in consideration of global information of the input image;

a texture detection unit which determines, using the second threshold value, whether a texture exists in a mask region composed of surrounding pixels existing within a predetermined range around a current pixel using the second threshold value, and decreases the first threshold value if it is determined that a texture exists in the mask region;

a pattern detection unit which determines whether a regularly repeated pattern exists in the mask region, using the third threshold value if it is determined that no texture exists in the mask region and decreases the first threshold value if it is determined that a pattern exists in the mask region; and a bit resolution enhancement unit which adjusts values of pixels in the mask region depending on the first threshold value, and enhancing bit resolution of the current pixel value using a resultant value obtained by filtering the adjusted pixel values.

* * * * *